United States Patent [19]

Kageyama

[11] Patent Number: 4,730,506

[45] Date of Patent: Mar. 15, 1988

[54] SPEED CHANGING APPARATUS USABLE FOR A SMALL CAR

[75] Inventor: Minoru Kageyama, Hamamatsu, Japan

[73] Assignee: Suzuki Motor Company Limited, Shizuoka, Japan

[21] Appl. No.: 65,109

[22] Filed: Jun. 23, 1987

Related U.S. Application Data

[63] Continuation of Ser. No. 756,074, Jul. 17, 1985, abandoned.

[30] Foreign Application Priority Data

Jul. 20, 1984 [JP] Japan .................. 59-149611

[51] Int. Cl.⁴ .................................. F16H 5/06
[52] U.S. Cl. .............................. 74/337.5; 74/476
[58] Field of Search ............. 74/337.5, 476, 475, 74/330, 353, 331, 333, 371, 372, 483 K, 485, 488

[56] References Cited

U.S. PATENT DOCUMENTS

| | | | |
|---|---|---|---|
| 1,343,132 | 6/1920 | Head | 74/337.5 |
| 1,715,178 | 5/1929 | Tredway | 74/377.5 X |
| 2,839,941 | 6/1958 | Rugen | 74/337.5 |
| 2,919,593 | 1/1960 | Spohn | 74/377.5 |
| 3,500,697 | 3/1970 | Schowalter | 74/377.5 X |
| 3,677,104 | 7/1972 | Hirozawa et al. | 74/337.5 |
| 3,688,596 | 9/1972 | Szodfridt | 74/337.5 |
| 3,739,656 | 6/1973 | Williams et al. | 74/337.5 |
| 3,841,170 | 10/1974 | Lazenberger | 74/337.5 |
| 3,954,021 | 5/1976 | Mraz | 74/337.5 |
| 4,022,079 | 5/1977 | Hidaka | 74/476 |
| 4,444,072 | 4/1984 | Grimes et al. | 74/475 |
| 4,581,950 | 4/1986 | Schrape et al. | 74/337.5 |

FOREIGN PATENT DOCUMENTS 161340 4/1982 Japan .

Primary Examiner—Leslie Braun
Assistant Examiner—David Novais
Attorney, Agent, or Firm—Birch, Stewart, Kolasch & Birch

[57] ABSTRACT

A speed changing apparatus usable for a small car of the type including a bar-shaped steering handle and a speed changing gear mechanism having plural forward movement stages and a single backward movement stage is disclosed which is characterized in that shifting of speed changing gears to any one of the forward and backward movement stages is controlled by rotational displacement of a rotary type change cam and the apparatus is provided with a stopper mechanism adapted to limit rotation of the change cam within the range of an angle of rotation which is determined by the forward movement stages, wherein the stopper mechanism is released from the operative state by use of an actuating lever which is disposed on the handle, thereby assuring inhibition of an occurrence of damage or injury of gears due to incorrect handling by virtue of arrangement which is so made that shifting to the backward movement is achieved by very simple operation but shifting of any gear cannot be achieved unless handling is performed in the presence of a distinct intention for backward movement.

7 Claims, 10 Drawing Figures

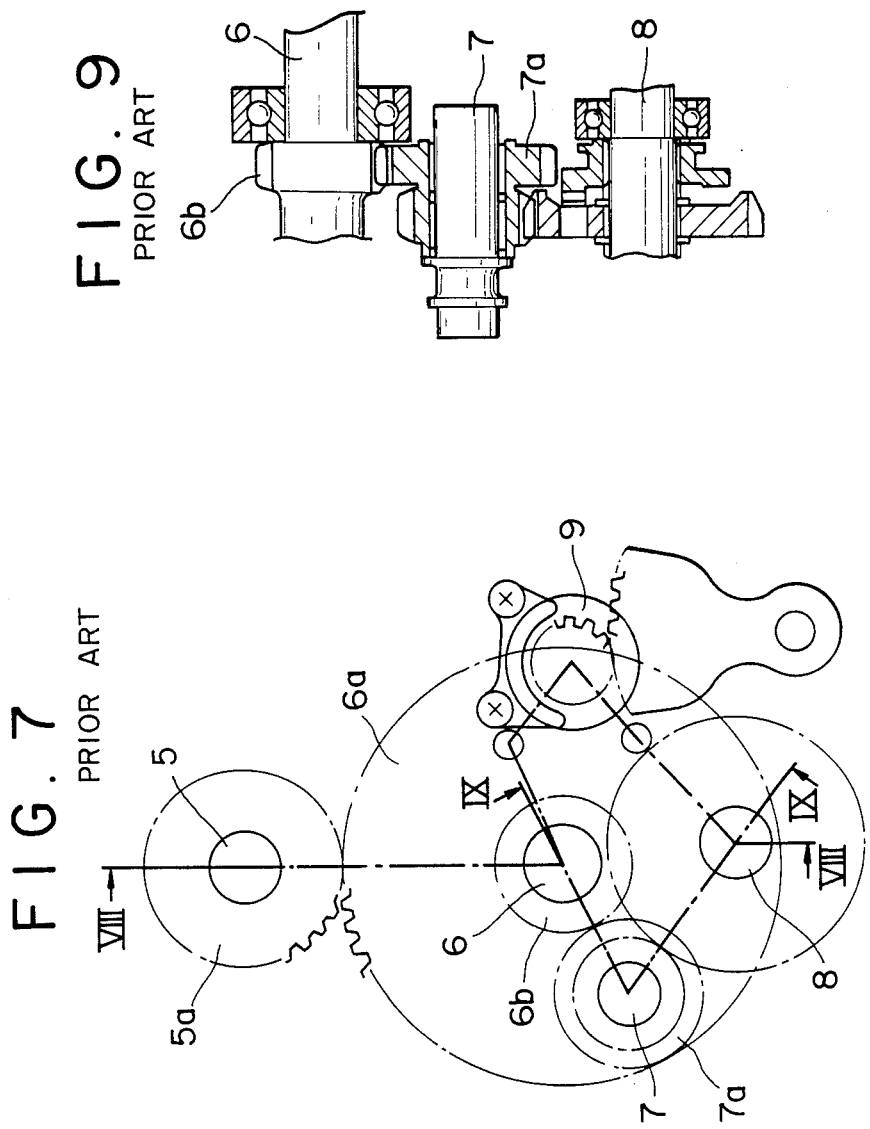

SPEED CHANGING APPARATUS USABLE FOR A SMALL CAR

This application is a continuation of appplication Ser. No. 756,074 filed on July 17, 1985, now abandoned.

BACKGROUND OF THE INVENTION:

(i) Field of the Invention

The present invention relates to a speed changing apparatus usable for a small car inclusive a car having three or four wheels adapted to move on any rugged ground, each of the cars being steered by means of a bar-shaped handle and having a gear for backward movement.

(ii) Description of the Prior Art

To facilitate understanding of the invention a typical conventional speed changing apparatus will be described below with reference to FIGS. 6 to 9.

FIG. 6(A) is a front view of a conventional car having four wheels adapted to move on rugged ground or land and FIG. 6(B) is a plan view of the car in FIG. 6(A). The car 1 is equipped with ballon tires 2 on both the front and rear axles which are filled with compressed air at a lower pressure. FIG. 7 is a schematic view illustrating how main components are arranged in the speed changing apparatus for the conventional saddle riding type car having three or four wheels or motorcycle. FIG. 8 is a partial sectional view of the speed changing apparatus taken in line VIII—VIII in FIG. 7 and FIG. 9 is a fragmentary sectional view of the speed changing apparatus taken in line IX—IX in FIG. 7. In the conventional speed changing apparatus as illustrated in FIGS. 7 to 9 rotational force of the crank shaft 5 is transmitted to a counter shaft 6 via a driving gear 5a, a gear 6a meshing with the former and a clutch mechanism (not shown) and rotational force thus transmitted to the counter shaft 6 is then transmitted to an auxiliary shaft 7, for instance, via a driving gear 6b and a driven gear 7a meshing with the former. Further, rotational force thus transmitted to the auxiliary shaft 7 is outputted from a driving shaft 8 as required rotational force via speed changing gears on the auxiliary shaft 7 and speed changing gears both on the driving shaft 8 and the counter shaft 7 meshing with the first mentioned speed changing gears in dependence on selection of the speed changing gears on a change cam 9.

Some small car of the above-mentioned type are provided with a gear for backward movement in the speed changing apparatus. The speed changing apparatus usable for a small car of the above-mentioned type is generally constructed such that shifting of gears in the speed changing mechanism is controlled by rotational displacement of a rotary type change cam 9 and the rotational position of the latter is selected by means of a foot pedal. To control shifting of the gear for backward movement the speed changing apparatus is additionally equipped with a separate shifting device and an actuating member. Operation of the actuating member is carried out after the change cam is displaced to the neutral position. Due to the arrangement of the speed changing apparatus made in that way, it is complicated in structure and handling is achieved only with many difficulties. In a modified speed changing apparatus the change cam is additionally formed with another cam groove to control shifting of the gear for backward movement. In this case one of the forward movement stages is selected by rotating the change cam by means of the one actuating member and the backward movement stage is selected by rotating the change cam by means of the same actuating member. This type of arrangement leads to an advantageous feature that structure and handling of the speed changing apparatus are simplified. However, it is found that this type of conventional speed changing apparatus has a drawback in that teeth on the gears are damaged or injured when the gear for backward movement is shifted unintentionally without sufficient preliminary confirming as to what speed stage is assumed by the apparatus at this moment, because the latter is so constructed that speed changing is successively carried out by repeating the same steps.

SUMMARY OF THE INVENTION

Hence, the present invention has been made with the foregoing background in mind.

It is an object of the invention to provide a speed changing apparatus usable for a small car of the above mentioned type which assures that shifting of gears for both forward and backward movements is controlled only by means of a single rotary type change cam and that when the car is to move backward, shifting of the gear for backward movement is achieved by simple handling.

It is other object of the invention to provide a speed changing apparatus usable for a small car of the early mentioned type which assures that an occurrence of incorrect operation is reliably prevented.

To accomplish the above objects there is proposed according to the invention a speed changing apparatus usable for a small car of the type including a bar-shaped steering handle and a speed changing gear mechanism having plural forward movement stages and a single backward movement stage, characterized in that shifting of speed changing gears to any one of the forward and backward movement stages is controlled by rotational displacement of a change cam and the apparatus is provided with stopper means adapted to limit rotation of the change cam within the range of an angle of rotation which is determined by the forward movement stages, wherein the stopper means is released from the operative state by means of an actuating member disposed on the handle.

By virtue of arrangement of the speed changing apparatus made in that way it is assured that shifting of speed changing gears to any one of the forward movement stages is achieved in the same manner as in the case of the conventional apparatus but the gear for backward movement fails to be shifted. According to the invention shifting of the gear for backward movement can be achieved by disengaging stopper means from the change cam by means of an actuating member which is disposed on a handle, when backward movement is required with the car. Accordingly, backward movement can be achieved only with a distinct intention for backward movement, when the car is to move backwardly. Thus, such a malfunction as damage or injury on gears does not take place by unintentionally shifting the gear for backward movement. Since the actuating member is additionally disposed on the handle, there is no necessity for complicated operation at a time when the actuating member is to be handled.

As will be readily apparent from the above description, the speed changing apparatus of the invention has the following advantageous effects.

One of them is that an occurrence of unintentional shifting of the gear for backward movement is inhibited with no teeth on the gear damaged or injured thereby, since the apparatus is so constructed that the change cam is provided with stopper means which serves to limit the range of rotation of the change cam in order to normally achieve shifting of speed changing gears to any one of the forward speed stages and the change cam can be rotated to shift the gear for backward movement only after the actuating member on the handle is operated. Another one is that a driver can easily grasp the actuating member quickly without any necessity for highly trained technique, because the actuating member required for releasing the stopper means is disposed on the handle. Another one is that the structure of the apparatus can be simplified, because forward and backward movement are controlled by rotating a single change cam.

Other objects, features and advantages of the invention will become more clearly apparent by reading of the following description which has been prepared in conjunction with the accompanying drawings.

BRIEF DESCRIPTION OF THE DRAWINGS

The accompanying drawings will be briefly described below.

FIG. 7 is a schematic view illustrating how main components constituting the conventional speed changing apparatus are arranged therein.

FIG. 9 is a fragmental sectional view of the conventional speed changing apparatus taken in line IX—IX in FIG. 7.

DESCRIPTION OF THE PREFERRED EMBODIMENTS:

Now, the present invention will be described in a greater detail hereunder with reference to the accompanying drawings which illustrate preferred embodiments of the invention.

Figure 1:
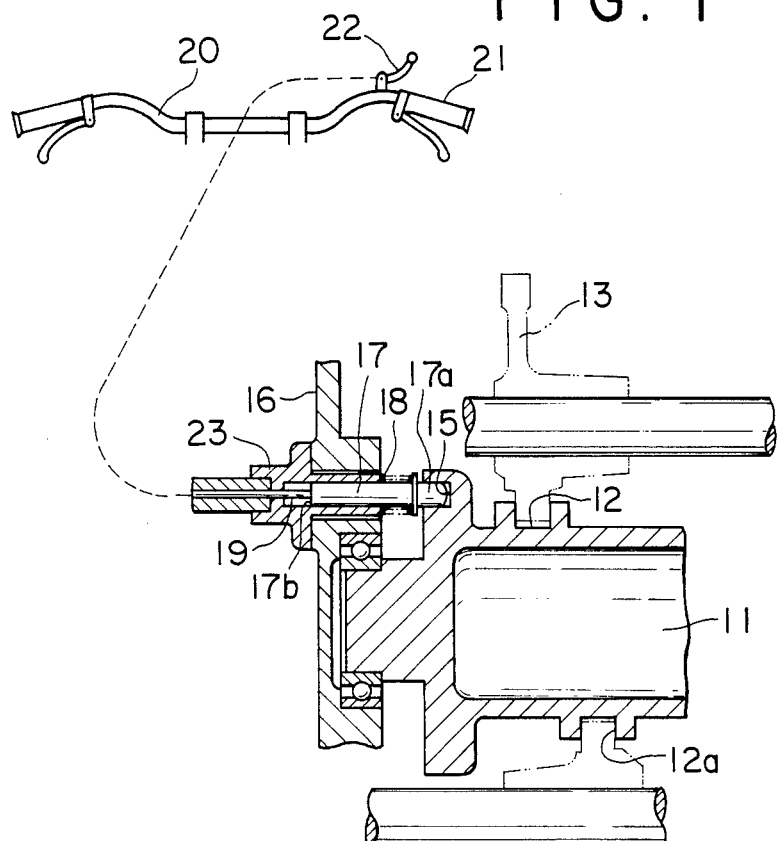
FIG. 1 is a sectional view of a speed changing apparatus in accordance with an embodiment of the invention.
Figure 2:
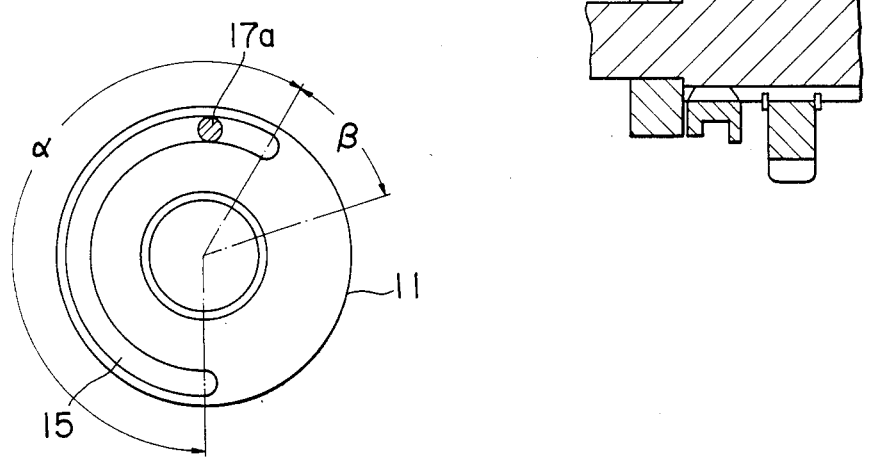
FIG. 2 is an end view of a change cam constituting the speed changing apparatus in FIG. 1.

Refering first to FIGS. 1 and 2, a rotary type change cam as identified by reference numeral 11 is designed in the form of a drum on which a shift groove 12 extending in the peripheral direction is formed. Thus, a shift fork 13 is displaced in the axial direction while it is guided by means of the shift groove 12. Specifically, the speed changing apparatus of the invention is provided with the number of combinations of shift grooves 12 and shift forks 13 required for gear shifting activity of the speed changing mechanism. As the change cam 11 is rotated, the shift forks 13 are caused to move in the axial direction whereby the gears are selectively shifted to the required speed stage in dependence on the rotational position of the change cam 11. Incidentally, a shift groove 12a shown in FIG. 1 is provided for the purpose of backward movement and a back gear 14 is shifted by way of the combination of shift groove 12a and shift fork 13a.

As is best seen from FIG. 2, the change cam 11 is formed with a partial circular groove 15 on one side surface thereof of which the center coincides with the axis of the change cam 11. In FIG. 1 reference numeral 16 designates a side wall of the transmission case by means of which the change cam 11 is rotatably supported. A stopper pin 17 is slidably inserted through the side wall 16 so that its foremost end 17a is fitted into the circular groove 15 under the effect of resilient force of a coil spring 18. A line of wire 19 is connected to the rearmost end 17b of the stopper pin 17 so that it is pulled by actuating a releasing lever 22 which is disposed at a position in the vicinity of a grip 21 of the bar-shaped handle 20. In the drawing reference numeral 23 designates a nut which is threadably engaged to the side wall 16 of the stopper pin 17.

As will be apparent from FIG. 2, rotation of the change cam 11 is limited within the range of an angle of $\alpha$ on the circular groove 15, as long as the foremost end 17a of the stopper pin 17 is inserted into the circular groove 15. The range as defined by an angle of $\alpha$ is so determined that a certain forward speed stage is selected, whereas shifting of the back gear 14 is achieved at the position as defined by an angle of $\beta$ outwardly of the range of an angle of $\alpha$. While the above-mentioned positional state is maintained, speed changing can be freely carried out to assume any one of forward speed stages but the back gear 14 can not be shifted any longer. When a car is to move backwardly, the foremost end 17a of the stopper pin 17 is disengaged from the circular groove 15 by actuating the releasing lever 22 on the handle 20 and the change cam is then rotated to reach the position as defined by an angle of $\beta$.

Figure 3:
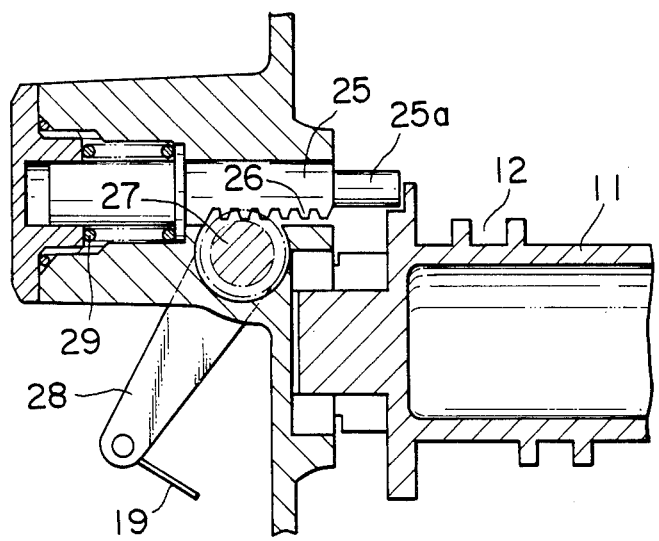
FIG. 3 is a sectional view of a speed changing apparatus in accordance with other embodiment of the invention.
Figure 4:
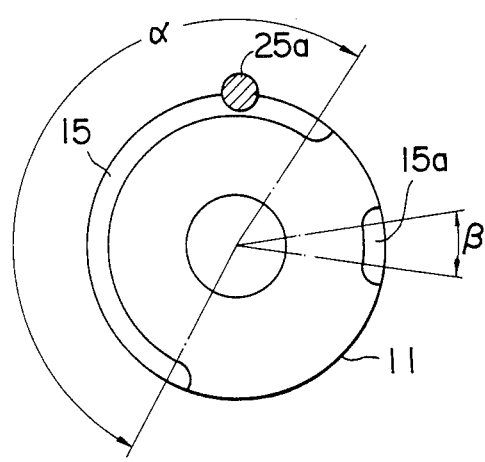
FIG. 4 is an end view of a change cam for the speed changing apparatus in FIG. 3.

Next, FIGS. 3 and 4 illustrate a speed changing apparatus in accordance with another embodiment of the invention.

A part of the stopper pin 25 is machined to form a rack gear 26 adapted to mesh with a pinion 27. A lever 28 is fixedly secured to the pinion 27 and it is operatively connected to the releasing lever 22 on the handle 20 by way of a line of wire 19. In the drawing reference numeral 29 designates a return spring in the form of a coil spring. The foremost end 25a of the stopper pin 25 is normally fitted into the partial circular groove 15 on the one side surface of the change cam 11 under the effect of resilient force of the return spring 29. Further, reference numeral 15a designates another partial circular groove which is formed for the purpose of backward movement. As is apparent from FIG. 4, the circular groove 15a is located in the area as defined by an angle of $\beta$ where shifting of the back gear 14 is achieved. While the foremost end 25a of the stopper pin 25 is kept in the circular groove 15, any one of forward speed stages can be freely selected. However, when the car is to move backwardly, the foremost end 25a of the stopper pin 25 is disengaged from the circular groove 15 by way of the combination of pinion 27 and rack gear 26 by actuating the releasing lever 22 whereby shifting of the back gear 14 is achieved. After completion of shifting operation the releasing lever 22 is restored to the initial position and thereby the foremost end 25a of the stopper pin 25 is fitted into the circular groove 15a which is formed for the purpose of backward movement. When there is a necessity for resuming one of forward speed stages, the releasing lever 22 is actuated again. As will be readily apparent from the above description, the speed changing apparatus of the invention is constructed in consideration of inhibiting an unintentional occurrence of shifting to one of forward speed stages during backward movement of the car.

Figure 5:
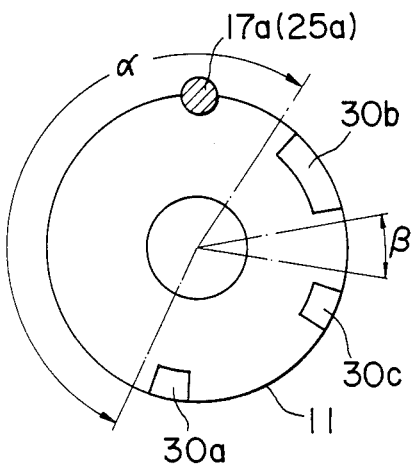
FIG. 5 is an end view of a change cam constituting a speed changing apparatus in accordance with another embodiment of the invention.
Figure 6A:
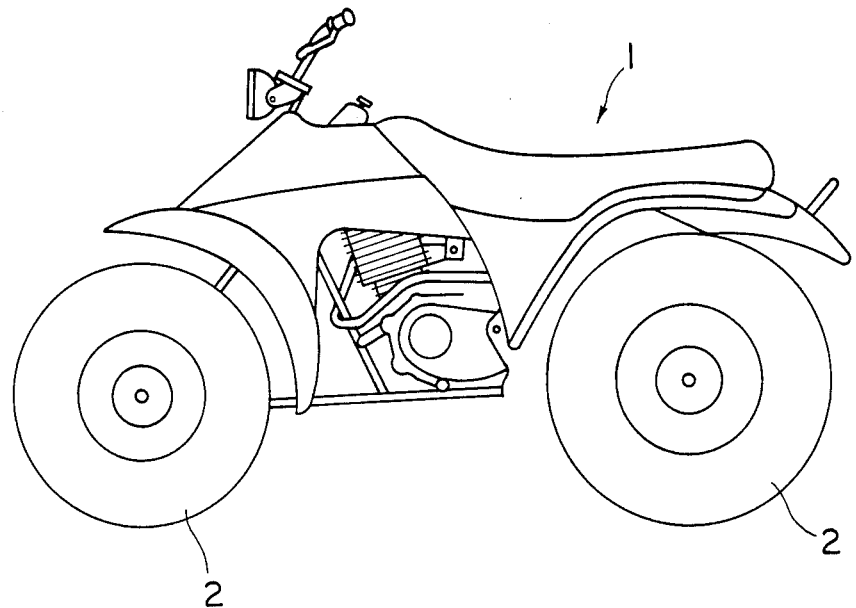
FIG. 6(A) is a side view of a saddle riding type car having four wheels in which a conventional speed changing apparatus is incorporated.
Figure 6B:
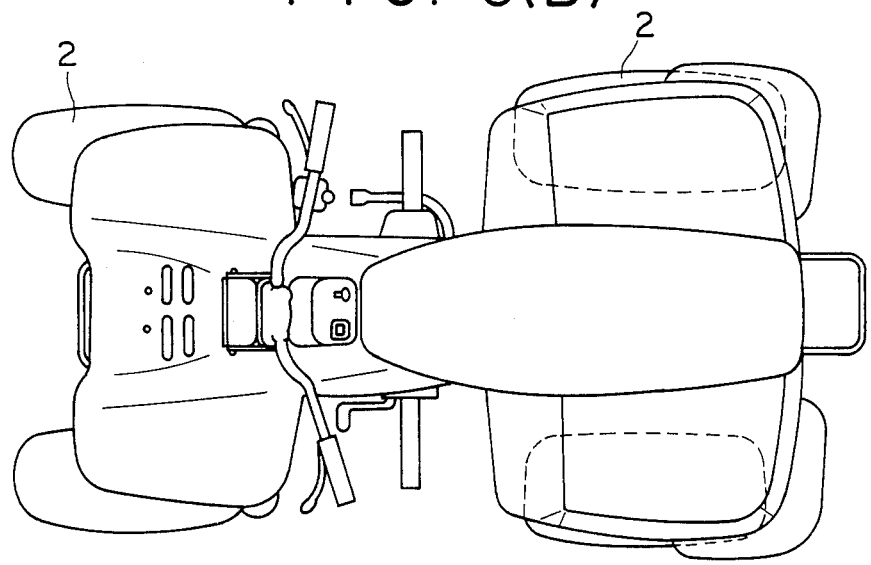
FIG. 6(B) is a plan view of the saddle riding type car in FIG. 6(A).
Figure 8:
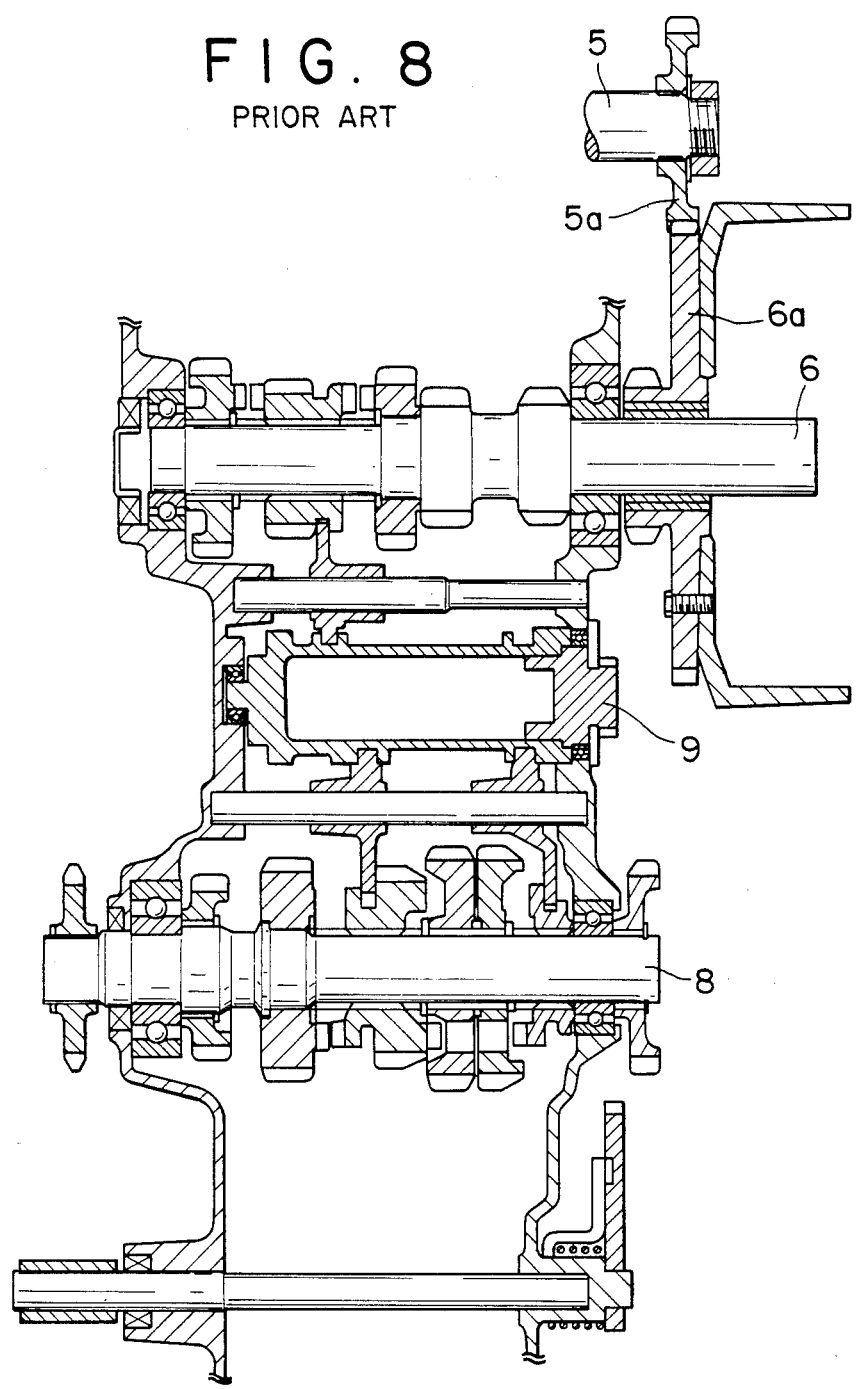
FIG. 8 is a sectional view of the conventional speed changing apparatus taken in line VIII—VIII in FIG. 7.

FIG. 5 is an end view of a change cam constituting the speed changing apparatus of the invention in accordance with another embodiment of the invention. In this embodiment the change cam 11 has three projections 30a, 30b and 30c projected from the side surface thereof, the projections 30a and 30c being located in the area as defined between the end of the range of an angle of $\alpha$ and the end of the range of an angle of $\beta$ and the projection 30b being located in the area as defined between the other end of the range of an angle of $\alpha$ and the other end of the range of an angle $\beta$, so that the foremost end 17a (25a) of the stopper pin 17 (25) may assume the position between the projections 30a and 30b as well as between the projections 30b and 30c. However, function of the stopper and releasing operation are achieved in the same manner as in the case of the foregoing embodiments.

While the present invention has been described above with respect to a few preferred embodiments thereof, it should of course be understood that it should not be limited only to them but that various changes or modifications may be made in any acceptable manner without departure from the spirit and scope of the invention as defined by the appended claims.

I claim:

1. A speed changing apparatus usable for a saddle-riding type car including a bar-shaped steering handle and a speed changing gear mechanism having plural forward movement stages and a single backward movement stage, said speed changing gear mechanism being located in a transmission case having a side wall, characterized in that shifting of speed changing gears to any one of said forward and backward movement stages is controlled by rotational displacement of a drum-shape rotary type change cam mounted in said transmission case and the apparatus is provided with a stopper means passing through said transmission case side wall and extending substantially parallel to said change cam for axial cooperation with engagement means formed at a side surface of said change cam and adapted to limit rotation of said change cam within the range of an angle of rotation which is determined by said forward movement stages, said stopper means being released from an operative state by means of an actuating member disposed on said bar-shaped steering handle.

2. A speed changing apparatus as defined in claim 1, characterized in that said stopper means is
   a stopper pin urged by resilient force and having its foremost end inserted into said engagement means which is a circular groove, said stopper pin being disengaged from said circular cam by means of said actuating member on the handle.

3. A speed changing apparatus as defined in claim 1, characterized in that said stopper means is
   a stopper pin urged by resilient force and having its foremost end projected into cooperation with said engagement means which is formed by two projections projecting from said side surface of said change cam, said stopper pin being disengaged from the projections by means of said actuating member on the handle.

4. A speed changing apparatus as defined in claim 2, characterized in that the rearmost end of said stopper pin
   and said actuating member are connected to each other by means of
   a wire and said actuating member is operated to pull said wire thereby disengaging said stopper pin from said partially circular groove.

5. A speed changing apparatus as defined as claim 3, characterized in that the rearmost end of said stopper pin
   and said actuating member are connected to each other by means of
   a wire and said actuating member is operated to disengage said stopper pin from said projections.

6. A speed changing apparatus as defined in claim 2, characterized in that a part of said stopper pin is machined to form a rack gear adapted to mesh with a pinion whereby said stopper pin is pulled by rotating said pinion by means of said actuating member on said handle.

7. A speed changing apparatus as defined in claim 3, characterized in that a part of said stopper pin is machined to form a rack gear adapted to mesh with a pinion whereby said stopper pin is pulled by rotating said pinion by means of said actuating member on said handle.

* * * * *